April 18, 1961 W. A. EAGER ET AL 2,980,433
INTERCHANGEABLE DRILL CHUCK AND HANDLE
Filed April 20, 1959
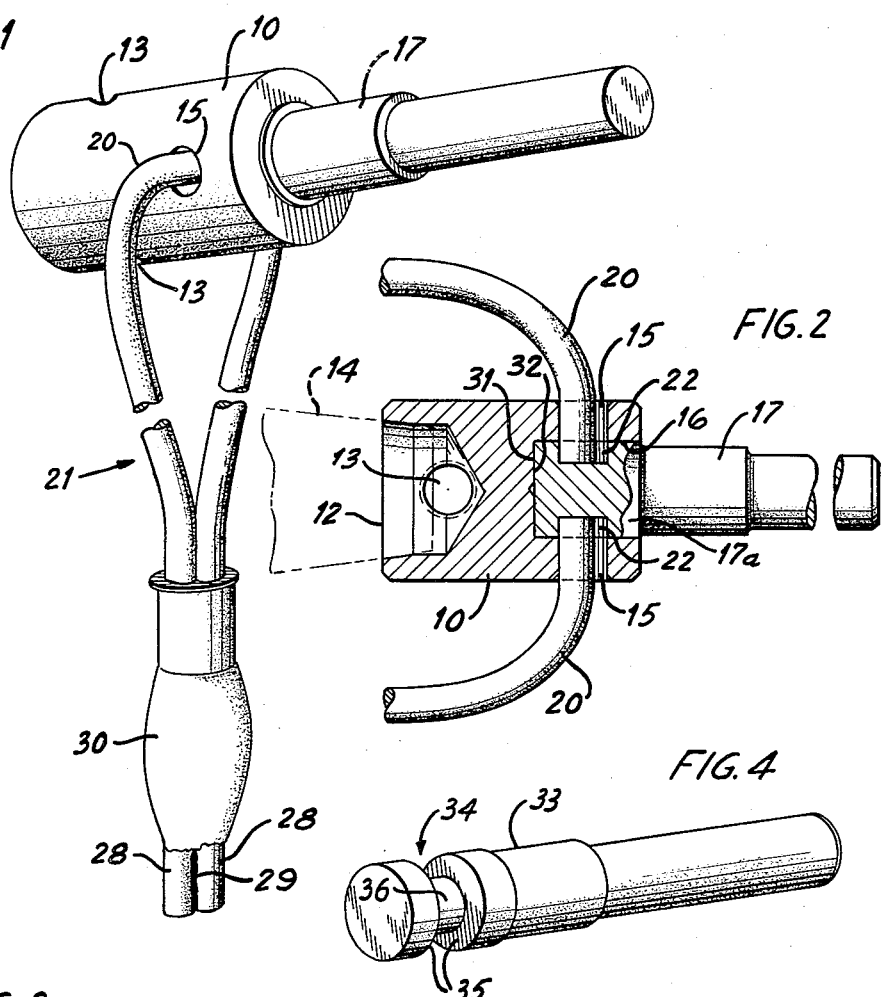
INVENTORS.
WILLAM A. EAGER
LEWIS WALTER BELL
BY
Edward Halle
ATTORNEY United States Patent Office 2,980,433
Patented Apr. 18, 1961

2,980,433
INTERCHANGEABLE DRILL CHUCK AND HANDLE

William A. Eager, Old Tappan, N.J., and Lewis Walter Bell, Monroe, N.Y., assignors to Star Precision Devices, Inc., Mountainville, N.Y., a corporation of Delaware Filed Apr. 20, 1959, Ser. No. 807,641

4 Claims. (Cl. 279—9)

This invention relates to interchangeable drill chucks and handles which are used in conjunction with percussive drills, principally for driving self-drilling shields. However, the chucks may be adapted to fit any type of percussive tool and may be used with various types of drills, bits and other tools. Before this invention, drill chucks were usually made integrally with chuck shanks designed to fit into a particular hammer or percussive tool. Due to the fact that this type of chuck is subjected to a tremendous amount of vibration and sharp, quick, staccato blows of great force, it was necessary to make the chuck and chuck-shank in one piece for the greatest strength and ability to absorb the punishment of the drilling operation without breakage.

The inherent disadvantages in a one-piece chuck and hammer shank arise from the fact that there are approximately one hundred different makes of hammers, each with its own unique shank socket dimensions. Since seven sizes of self drilling shields are usually employed, seven hundred possible models of chucks may be needed.

In making an interchangeable chuck and chuck shank combination, it is therefore an object to reduce the number of chuck and chuck shank combinations from seven hundred or more to not more than one hundred and seven. This is accomplished by providing each of the one hundred chuck shanks with universally interchangeable chucks which will fit on each of them, thus, replacing seven hundred separate tool attachments with any one of seven chucks combined with any one of one hundred chuck shanks.

It is another object of this invention to provide an interchangeable chuck and chuck shank combination of which fewer styles will have to be stocked in storerooms, and with which fewer tools will be necessary in work-kits. It is also an object of this invention to provide an interchangeable chuck for easy change-over for different types of power hammers. It is a further object of this invention to provide for a more flexible inventory of chuck fittings for power hammers.

This invention also provides for a chuck which may be easily changed over from a power hammer to a hand-type hammer for use with hand-driven self drilling shields, percussion drills, and the like. Finally, this invention provides an interchangeable chuck which may be used for any percussive drilling operation.

The objects of the invention are achieved in the forms of the device set forth in the accompanying drawings, in which:

Fig. 1 is a perspective view of the interchangeable chuck in combination with a separate chuck shank being held together by means of the ends of the handle, with parts of the handle broken away to shorten the length thereof, and part of the hand grip removed;

Fig. 2 is a side elevation of the chuck and chuck shank combination with a partial cross-section through the center of the chuck to show how the parts are fitted and held together;

Fig. 3 is a side elevational view of the interchangeable chuck (with a portion of the chuck cut away) with a partial cross-section through a central plane of the chuck to show how the parts are fitted and held together; and Fig. 4 is a perspective view of another chuck shank.

Similar numerals refer to similar parts throughout the several views.

The interchangeable chuck 10 and chuck shank 17 are made of steel stock in the usual manner on lathes. The chuck has a socket 12 at one end thereof which is preferably tapered and in which a self-drilling shield 14 or other tool may be fitted. The chuck 10 also has keyholes 13 which open into the socket 12, through which a key or other instrument can be inserted to knock out the self-drilling shield 14 or other tool which has been fitted into the socket.

The interchangeable chuck 10 also has two handle end openings 15. There is a chamber 16 for receiving the end 17-a of a chuck shank 17 (adapted to fit a power hammer not shown), or the end 18 of a hand held chuck handle 19. The handle end openings 15 connect with the shank receiving chamber 16 so that the chuck-engaging ends 20 of a wire handle 21 can fit through the handle end openings 15 in the chuck 10, and into chuck shank openings 22 in the chuck shank end 17-a.

The handle 21 is made of steel wire—and has pincerlike jaws formed by the chuck engaging handle ends 20. The construction of the handle which will be more fully described hereinbelow is such that the ends 20 can be drawn apart by manual pulling and withdrawn from the chuck shank openings 22 and from the handle end openings 15. When this is done, the chuck 10 and the chuck shank 17 are separable.

If it is desired to assemble the chuck for use with a power hammer tool, a chuck 10 and a chuck shank 17 of the proper size and type are selected. The chuck shank end 17-a is placed in the chamber 16 of the chuck 10. The ends 20 of the handle 21 are then placed into the handle end openings 15. The chuck shank openings 22 should be in line with the handle end openings 15 of the chuck 10. The pincerlike force which pushes the handle ends 20 together will force the said handle ends 20 into and in engagement with the handle end openings 15 and the chuck shank openings 22 and thereby secure the combination together.

The same interchangeable chuck 10 can be used for driving a self-drilling shield percussive drill, or the like, by hand, rather than with a power hammer, by combining it with a hand held chuck handle 19. This is done by providing the hand held chuck handle 19 with a shank end 18 adapted to fit into the chamber 16 of the chuck 10. The handle shank end 18 has a detent opening 23 and a removable detent 24 is fitted into one of the chuck handle openings 15 and into the detent opening 23.

The detent 24 is held in place by a spring clip 25 which is adapted to slide over the chuck 10 and maintain itself in position by reason of its spring action. It may be desirable to provide the spring clip with a depression 26 to fit over and engage the end 27 of the detent 24.

The wire handle 21 is made preferably of cold drawn steel wire formed in a conventional manner around a form. The handle grip ends 28 are then welded together as shown at reference numeral 29. The handle is then heat treated and slit to form the ends 22. A hand grip 30 of rubber or plastic may be provided.

The dimensions of the chuck 10 and the shank portions 17-a and 18 which fit into the chamber 16, are such that the force of the hammer blow is taken up directly on the surfaces designated 31 and 32 in the drawings and not on the ends 22 of the wire handle. This action can be accomplished by providing a standardized chuck shank end 17–a or chuck handle end 18 to fit any chuck 10 that has a standard sized chamber 16; and by providing for accurate registration of the openings 15 and 22 (or 23) when the surfaces 31 and 32 are in close face-contacting relation.

In addition to the objects and advantages set forth hereinabove, it is apparent that there is a further advantage in a saving of material and labor. The conventional chuck and chuck shank were made in one piece. This made it necessary to use a bar of metal stock of sufficient diameter for the chuck portion. The chuck shank has a much smaller diameter than the chuck portion of the tool. As a result, a vast amount of the metal stock surrounding the hammer shank was wasted in the turning operation. By making the chuck 10 and chuck shank 17 separately, two different sizes of stock can be used and a considerable saving in material and labor can be effected.

In Fig. 4 of the drawings we show another form of the chuck shank 33. The chuck shank 33 has an annular groove 34 with substantially parallel sides 35 and a substantially cylindrical bottom 36. The width of the annular groove 34 corresponds to the diameter of a chuck shank opening 22 and in all other respects the chuck shank 33 is standardized to fit within a standard chamber 16 in a chuck 10 so that when the ends 20 of the handle 21 are inserted through the openings 15 they will also fit into the annular groove 34.

While we have described our invention in its preferred forms, we conceive that it can be made in other equivalent forms without departing from the scope of the invention. For example, instead of using the exact handle 21, or detent 24, to retain the parts of our chuck in combination, we may use a handle or detent of different design or shape or other similar retention means. We therefore desire to be protected for all devices coming within the scope of the claims appended hereinbelow.

Wherefore, we claim:

1. An interchangeable chuck combination comprising: a chuck having a tool receiving socket and a chamber, said chamber having an open outer end, an inner end forming a seat, and means between the said ends of the said chuck chamber communicating between the inside of said chamber and the outside of the said chuck; a separable shank with an outer end, and an inner end having recessed means; and a handle associated with retention means adapted to be removably engaged to the said chuck and shank; in which the said chamber of the said chuck and the inner end of the said shank have substantially the same cross section shape, with the inner end of the shank being relatively smaller in cross section measurement than the said chamber, so that the said inner end of the shank will slide fit into the said chuck chamber with the said inner end of the shank being in faced contacting relationship with the said seat formed in the chuck chamber; and whereby when the inner end of the shank is slide fitted into the chuck chamber, and the retention means associated with the handle are placed within the said outside communicating means in the chuck chamber and the recessed means in the inner end of the shank, the chuck, the shank and the handle will be held in engaged combination.

2. The combination as defined in claim 1, in which the handle comprises wire and the retention means associated with the handle is at least one end of the said wire.

3. The combination as defined in claim 1, in which the outside communicating means in the said chuck chamber comprise a pair of opposed transverse openings, the handle comprises wire, and the retention means associated with the handle comprise a pair of ends formed from the said wire.

4. The combination as defined in claim 1, in which the said chuck chamber and the inner end of the said shank are cylindrical in shape and are adapted to slide fit together coaxially.

References Cited in the file of this patent
UNITED STATES PATENTS

| | | |
|---|---|---|
| 1,047,532 | Johnson | Dec. 17, 1912 |
| 1,496,067 | Penberthy | June 3, 1924 |
| 1,604,007 | Wigren | Oct. 19, 1926 |
| 2,304,038 | Thompson | Dec. 1, 1942 |
| 2,399,939 | Phillips | May 7, 1946 |
| 2,767,988 | Dieterich et al. | Oct. 23, 1956 |